United States Patent [19]

Yamamoto et al.

[11] Patent Number: 4,722,190
[45] Date of Patent: Feb. 2, 1988

[54] METHOD FOR ENERGY RECOVERY FROM OXIDATION REACTOR OFF-GAS

[75] Inventors: Kazuo Yamamoto, Yokohama; Hiromi Nakamura, Kashiwa; Takehiko Takahashi, Matsudo, all of Japan

[73] Assignee: Mitsubishi Gas Chemical Company, Inc., Tokyo, Japan

[21] Appl. No.: 13,495

[22] Filed: Feb. 11, 1987

[30] Foreign Application Priority Data

Mar. 4, 1986 [JP] Japan ............................... 61-45355

[51] Int. Cl.$^4$ ................................................ F02C 7/00
[52] U.S. Cl. .................................... 60/648; 60/649; 60/39.05; 60/39.53
[58] Field of Search ............... 60/39.05, 39.12, 39.55, 60/648, 649, 39.53

[56] References Cited

U.S. PATENT DOCUMENTS 4,499,721 2/1985 Cheng ........................... 60/39.05
4,537,023 8/1985 Nakamura et al. ............. 60/39.05

FOREIGN PATENT DOCUMENTS 51-131458 11/1976 Japan .
57-31735 7/1982 Japan .
60-219421 11/1985 Japan .
61-106924 5/1986 Japan .

Primary Examiner—Allen M. Ostrager
Attorney, Agent, or Firm—Armstrong, Nikaido, Marmelstein & Kubovcik

[57] ABSTRACT

The present invention relates to a method for efficiently recovering energy from off-gas with high temperatures and high pressures released from the oxidation reactor of aromatic compounds such as xylene, pseudocumene, durene and the like. More particularly, the present invention relates to a method for energy recovery from oxidation reactor off-gas, which comprises subjecting off-gas with high temperature and high pressure from an oxidation reactor to heat exchange with cooling water to cool the off-gas, subjecting the cooled off-gas to direct counter-flow contact with the water heated by said heat exchange to obtain a mixture of off-gas and steam, and cooled water, circulating the cooled water for reuse as said cooling water for said high temperature and high pressure off-gas, and sending the mixture of off-gas and steam to an expander to recover energy therefrom. According to the present invention, the energy recovered from off-gas increases by an amount equivalent to the amount of steam saturating in and accompanying the off-gas.

4 Claims, 2 Drawing Figures

METHOD FOR ENERGY RECOVERY FROM OXIDATION REACTOR OFF-GAS

BACKGROUND OF THE INVENTION

1. Field of the Invention

The present invention relates to a method for efficiently recovering energy from off-gas with high temperatures and high pressures released from the oxidation reactor of aromatic compounds such as xylene, pseudocumene, durene and the like.

2. Description of the Prior Art

Conventionally, off-gas released from the liquid phase oxidation reactor of aromatic compounds, in order to recover effective components in the off-gas and to control the reaction temperature, is firstly cooled by heat exchange; then, the condensed components in the off-gas are separated and part of them is circulated to the reactor for reuse while the rest is subjected to recovery of effective components. Meanwhile, the non-condensible off-gas component is preheated and then sent to an expander to recover energy from these off-gas component. [Japanese Patent Application Kokai (Laid-Open) No. 131458/1976, Japanese Patent Model Publication No. 48615/1985]. This prior art is shown in the process flow diagram of FIG. 1. That is, an off-gas 1 released from oxidation reactor 6 with a temperature of about 200° C. and a pressure of 15 to 20 atm is sent to a heat exchanger 2 where low pressure steam is generated by heat exchange; the off-gas after heat exchange is sent to a cooler 3 for cooling; the cooled off-gas is sent to a separator 4 where the condensible components in the off-gas such as the reaction solvent, organic substances as by products and the like are condensed; part of the condensed components is circulated to a reactor 6 via a pipe 5 for recovery; and the rest of the condensed components is taken out via a pipe 7 for suitable disposal. Meanwhile, the off-gas component is sent to a preheater 9 via a pipe 8 for heating; the off-gas component after heating is sent to a combustor 10 where the organic components remaining in the heated off-gas component which may corrode an expander 11 are subjected to catalytic combustion to be converted inorganic substances; and the gas after combustion is sent to the expander 11 to recover energy there from.

In this prior art, however, it is impossible to recover the heat from the off-gas with a temperature of about 150° C. leaving the heat exchanger 2, and this off-gas is then cooled at the cooler 3 to around normal temperature by cooling water to enable recovery and removal of the condensible components in the off-gas at the separator 4. Accordingly, the heat energy in the off-gas leaving the heat exchanger 2 is wasted.

Separately from the above heat recovery from oxidation reactor, the present inventor previously found that in a water injection type regenerative gas turbine cycle, the thermal efficiency can be improved by directly contacting an outlet gas (air) of an air compressor with water to humidify the gas and feeding the mixture of off-gas and steam to a gas turbine. Based on this finding, the inventor filed application for a patent (U.S. Pat. No. 4,537,023).

The present inventor also found a method for efficient recovery of waste heat from processes wherein the waste heat of plants other than gas turbine cycle plants is subjected to heat exchange with cooled water from the bottom of a compressed air-liquid phase water contacting tower and the heated liquid phase water is circulated to the contacting tower. Based on this finding, the inventor filed an application for a patent [Japanese Patent Application Kokai (Laid-Open) No. 106924/1986].

SUMMARY OF THE INVENTION

In order to solve the above mentioned drawback of the conventional method of recovery of reaction heat, the present invention has utilized the above mentioned heat recovery system in gas turbine cycle and thereby provides a more efficient method for energy recovery from off-gas than the conventional method.

According to the present invention, there is provided a method for energy recovery from the off-gas released from oxidation reactor, which comprises subjecting an off-gas with high temperature and high pressure from an oxidation reactor to heat exchange with cooling water to cool the off-gas, subjecting the cooled off-gas to direct counter-flow contact with the water heated by said heat exchange to obtain a mixture of off-gas and steam, and cooled water, circulating the cooled water for reuse as said cooling water for said high temperature and high pressure off-gas, and sending the mixture of off-gas and steam to an expander to recover energy therefrom.

The method of the present invention is explained using a drawing (FIG. 2). In FIG. 2, an off-gas 1 is subjected as necessary to heat exchange with water at a heat exchanger 2 (thereby, steam of low pressure is generated) and then cooled at coolers 3-A and 3-B; the cooled off-gas is subjected to condensation and separation of condensible components at a separator 4; part of the condensate is circulated to a reactor 6 via a pipe 5; and the rest of the condensate is taken out for suitable disposal. The non-condensible off-gas component is sent via a pipe 8 to a contacting tower 12 where the off-gas is subjected to direct counter-flow contact with the heated water from the cooler 3-A; and the cooled water from the tower bottom is combined with make-up water 13 and is circulated to the cooler 3-A via a pipe 14 for reuse as a cooling water for the cooler 3-A.

Meanwhile, the mixture of off-gas and steam from the top of the contacting tower is heated at a preheater 9, subjected as necessary to catalytic combustion of remaining organic components at a combustor 10 and sent to an expander 11 for energy recovery.

The present invention method can be carried out under various modifications. For example, it is possible that a heat exchanger is installed between the coolers 3-A and 3-B and the make-up water is preheated at this heat exchanger and then used as part of the circulating cooling water. Or, it is possible that the heat exchanger 2 is omitted when the oxidation temperature in the reactor 6 is low depending upon the type of aromatic compound to be oxidized. Or, it is possible that the combustor 10 is omitted depending upon the property of off-gas Or, it is possible that reheating cyclization is employed at the expander 11, that is, a gas from an intermediate stage lower outlet of the expander is heated and sent to a next stage inlet thereof. Or, it is possible that the mixture of off-gas and steam is utilized as part of an working medium (air) of gas turbine cycle, as mentioned in Japanese Patent Application Kokai (Laid-Open) No. 219421/1985 by the present applicant.

In the present invention, aromatic compounds refer to, for example, toluene, xylene, pseudocumene, hemimellitene, mesitylene, durene, methylnaphthalene and their oxidation derivatives (e.g. tolualdehyde, dimethylbenzaldehyde, trimethylbenzaldehyde, toluic acid, dimethylbenzoic acid, trimethylbenzoic acid, carboxybenzaldehyde). The oxidation reaction of these aromatic compounds can be conducted according to a generally known process, that is, in an acetic acid or water solvent, in the presence of a catalyst such as cobalt, manganese, bromine or the like, at a temperature of 150° to 250° C., preferably 180° to 220° C., at a pressure of 5 to 50 atm, preferably 10 to 30 atm with an oxygen-containing gas being blown in.

The temperature of the off-gas to be sent to the contacting tower is 30° to 60° C., and the temperature of the heated water supplied from the tower top is 120° to 180° C. This off-gas and the heated water are contacted directly at the contacting tower, whereby the water is cooled to 60° to 100° C. and simultaneously the off-gas is heated to 100° to 160° C. The off-gas is further heated to 200° to 300° C. at the preheater, after which the temperature of the gas further goes up at the combustor and sent to the expander.

As the contacting tower, ordinary gas-liquid contacting apparatuses can be used. Therefore, a packed tower, a wetted wall tower, a plate tower, a spray tower, etc. can be used. The water used herein need not be pure water. It can be waste waters from processes which contain combustible gases or inert gases discharged from said oxidation reactor or other apparatuses.

In the present invention, the heat energy of the off-gas released from the oxidation reactor of aromatic compounds is recovered until its temperature is cooled down to 80° to 120° C., and then the off-gas is sent to the expander. Therefore, the heat energy of the off-gas can be recovered effectively.

DESCRIPTION OF PREFERRED EMBODIMENTS

Figure 1:
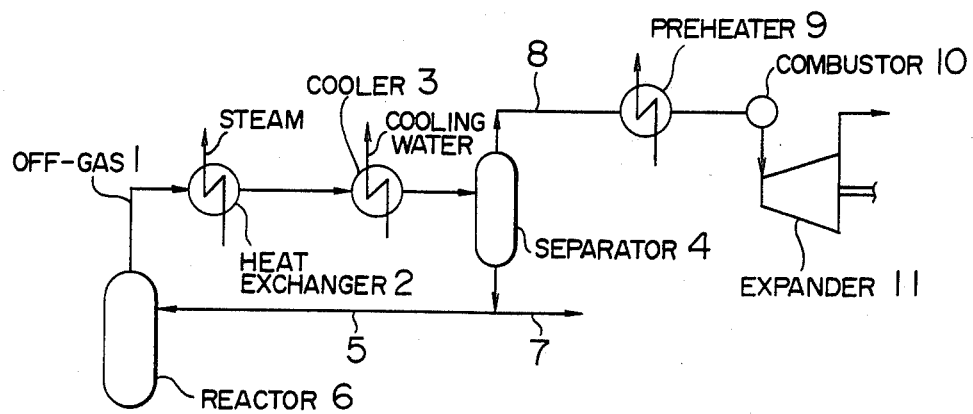
FIG. 1 shows a process flow diagram according to the prior art for the heat recovery from off-gas released from oxidation reactor of aromatic compounds.
Figure 2:
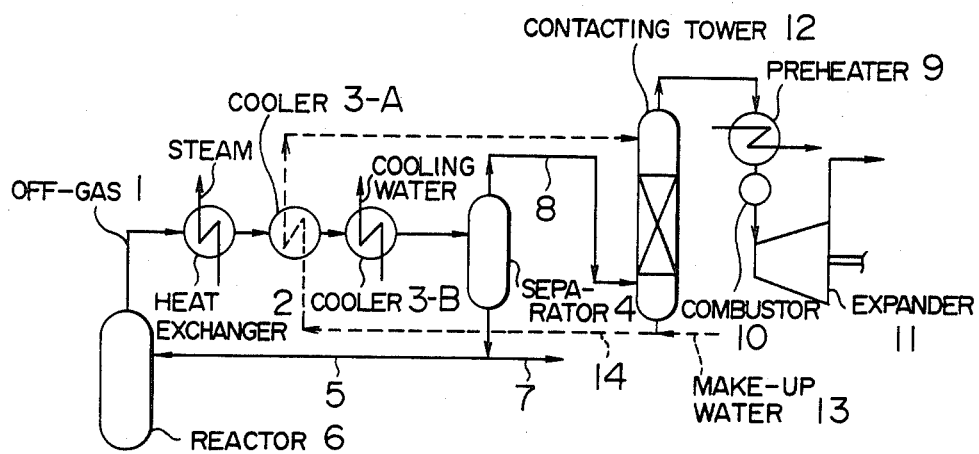
FIG. 2 is a process flow diagram according to the present invention for the same heat recovery.

The results of heat recoveries according to the prior art of FIG. 1 and the present invention of FIG. 2 are compared in Table 1.

In the present invention, differently from the prior art of FIG. 1, a cooler 3-A and a contacting tower 12 are installed additionally. This increases the amount of the off-gas from which energy is to be recovered, by an amount equivalent to the amount of steam saturating in and accompanying the off-gas. As a result, the energy recovered from the off-gas is increased. As shown in Table 1, energy recovery can be increased by 16% (700 kw) in the present invention as compared with the prior art.

TABLE 1

|  | Conventional method | Present method |
|---|---|---|
| Heat recovery from and cooling of off-gas released from oxidation reactor | 180° C. ↓ Recovery of 2K steam ↓ Q = 6.8 × 10⁶ kcal/h ↓ 150° C. ↓ Heat removal by cooling ↓ water ↓ Q = 7.2 × 10⁶ kcal/h ↓ 45° C. | 180° C. ↓ Recovery of 2K steam ↓ Q = 6.8 × 10⁶ kcal/h ↓ 150° C. ↓ Preheating of circulating water ↓ Q = 4.3 × 10⁶ kcal/h ↓ 110° C. ↓ Heat removal by cooling ↓ water ↓ Q = 2.9 × 10⁶ kcal/h ↓ 45° C. |
| Cooling water (T/h) | 500 | 200 |
| Make-up water (T/h) | Not used | 5.1 |
| Preheater 9, inlet Temperature (°C.) | 49 | 123 |
| Flow rate (Nm³/h) | 42,000 | 48,400 |
| Recovered energy*¹(kw) | 4,400 | 5,100 |

*¹An expander of reheating type was used with the inlet temperature being 360° C. and 260° C. respectively. By additionally installing a cooler 3-A and a contacting tower 12, recovered energy increased by 700 kw.

What is claimed is:

1. A method for energy recovery from the off-gas released from oxidation reactor which comprises subjecting off-gas with high temperature and high pressure from an oxidation reactor to heat exchange with cooling water to cool the off-gas, subjecting the cooled off-gas to direct counter-flow contact with the water heated by said heat exchange to obtain a mixture of off-gas and steam, and cooled water, circulating the cooled water for reuse as said cooling water for said high temperature and high pressure off-gas, and sending the mixture of off-gas and steam to an expander to recover energy therefrom.

2. A method according to claim 1, wherein the temperature of the off-gas to be subjected to direct counter-flow contact is 30° to 60° C., and the temperature of the heated water to be contacted with the off-gas is 120° to 180° C.

3. A method according to claim 1, wherein the direct counter-flow contact is carried out using a contacting tower selected from packed tower, wetted wall tower, plate tower and spray tower.

4. A method according to claim 1, wherein the expander is reheating type expander.

* * * * *